(12) United States Patent
Adarve Lozano

(10) Patent No.: US 8,047,471 B2
(45) Date of Patent: Nov. 1, 2011

(54) INDICATION SYSTEM AND METHOD FOR REFUELLING OPERATIONS

(75) Inventor: Alberto Adarve Lozano, Madrid (ES)

(73) Assignee: EAD Construcciones Aeronauticas, S.A., Madrid (ES)

( * ) Notice: Subject to any disclaimer, the term of this patent is extended or adjusted under 35 U.S.C. 154(b) by 506 days.

(21) Appl. No.: 12/373,000

(22) Filed: Feb. 18, 2009

(65) Prior Publication Data

US 2010/0108816 A1 May 6, 2010

(30) Foreign Application Priority Data

Oct. 30, 2008 (EP) .................................... 08382061

(51) Int. Cl.
*B64D 39/00* (2006.01)
(52) U.S. Cl. .................................................. 244/135 A
(58) Field of Classification Search .................... 244/24, 244/25, 29–31
See application file for complete search history.

(56) References Cited

U.S. PATENT DOCUMENTS

| | | | | |
|---|---|---|---|---|
| 3,917,196 A * | 11/1975 | Pond et al. | ...................... | 342/23 |
| 4,025,193 A * | 5/1977 | Pond et al. | ...................... | 356/5.1 |
| 6,966,525 B1 * | 11/2005 | Schroeder | .................. | 244/135 A |
| 7,093,801 B2 * | 8/2006 | Schroeder | .................. | 244/135 A |
| 7,298,291 B2 * | 11/2007 | von Thal et al. | ............... | 340/958 |
| 7,413,144 B2 * | 8/2008 | Schroeder | .................. | 244/135 A |
| 7,475,852 B2 * | 1/2009 | Hewitt et al. | .............. | 244/135 A |
| 7,980,512 B1 * | 7/2011 | Speer et al. | ................ | 244/135 A |

* cited by examiner

*Primary Examiner* — Richard Price, Jr.
(74) *Attorney, Agent, or Firm* — Ladas & Parry LLP

(57) ABSTRACT

System (1) for providing indication of the position of a refuelling boom (2) in a tanker aircraft relative to a receptacle (17) in a receiver aircraft during refuelling operations, in particular in the approximation operation, the system (1) comprising a plurality of light emitting devices (23-33) mountable on the boom (2), each emitting device (23-33) providing a respective visible light beam, said light beams providing spots of incidence (3-13) when contacting the receptacle (17) in the receptor aircraft, in such a manner that the position of the spots of incidence (3-13) on the receptacle (17) varies depending on the position of the refuelling boom (2) relative to the receiver aircraft in the approximation operation. The invention also relates to a method for the approximation operation of a refuelling boom (2) in a tanker aircraft to a receptacle (17) in a receiver aircraft operating such a system (1).

10 Claims, 4 Drawing Sheets

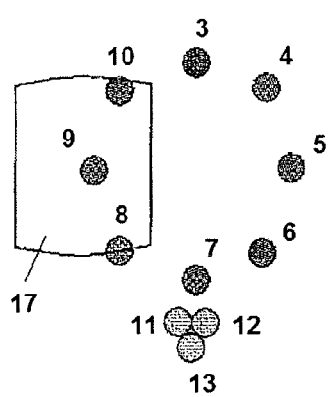
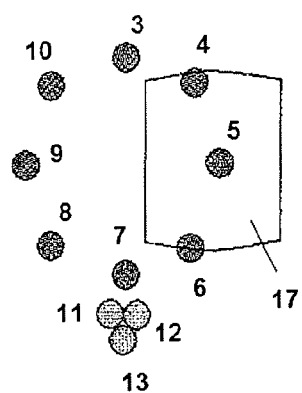
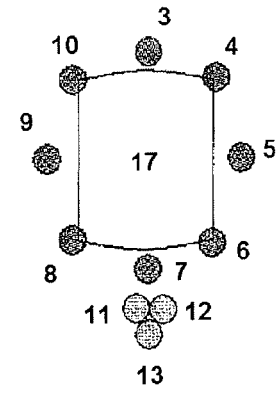
FIG. 4a          FIG. 4b          FIG. 4c
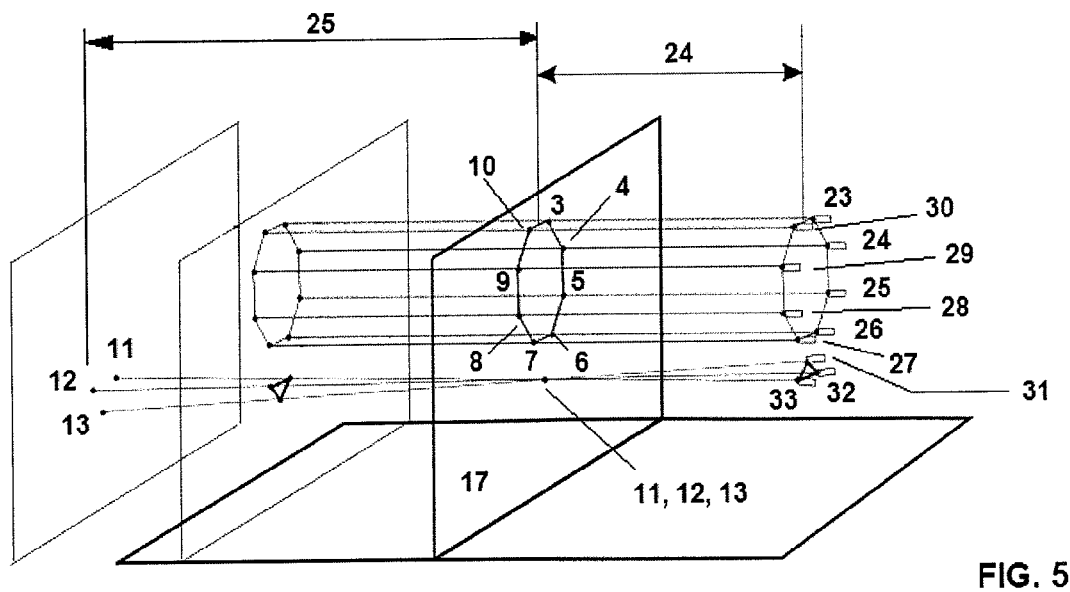
FIG. 5

INDICATION SYSTEM AND METHOD FOR REFUELLING OPERATIONS

FIELD OF THE INVENTION

The invention relates generally to a system for indicating the distance and location from a tanker and a receiver aircraft at refuelling operations. The invention also relates to a method for operating such a system.

BACKGROUND

For in-flight refuelling operations, one usual method is based on the use of a boom device for interconnecting a tanker aircraft with a receiver aircraft or receptor in flight, which is basically a telescopic or extensible tube attached to the underside of the tanker aircraft by means of an articulation element, that provides fuel passage from the tanker aircraft to the receiver aircraft. At the tanker aircraft, the operator controls visually all steps and procedures for a safe refuelling operation. From the tanker, the operator controls the boom movements and therefore manipulates the boom until it makes a physical connection with the receptacle of the approaching receptor aircraft. Once the refuelling operation is finished in a certain session, the boom is hoisted up to its secured position in the tanker aircraft.

This operation, in particular the approximation operation of the boom relative to the receiver aircraft, is very sensitive and must be effected in a very precise and accurate way because of security reasons.

Typically, and used in the field of robotics, sensing apparatus comprising laser light generators and ultrasound sensors are used for generating signals usable for guiding a robot. This is disclosed, for example, in document U.S. Pat. No. 7,283,892. Ultrasound sensors used in the field of in-flight refuelling operations have the problem of the in-flight air velocity disturbing the sensor measurements, being this problem aggravated by the object being moving.

Another possibility is to use distance measurement by laser interferometry, as it is for example disclosed in documents WO 03/058158, EP 1750086, EP 0469718, EP 0027763 and U.S. Pat. No. 5,828,456. This system is not, however, applied to the field of refuelling.

The present invention comes to solve the above-mentioned drawbacks.

SUMMARY OF THE INVENTION

Therefore, the objective of the present invention is to provide a system that provides a safe and proper indication regarding the position of a refuelling boom at a tanker aircraft and a receptor at a receiver aircraft during refuelling operations, in particular in the approximation operation of the boom.

The indication system comprises a plurality of light emitting devices mountable on the refuelling boom, each emitting device providing a respective visible light beam, said light beams providing spots of incidence when contacting the receptacle in the receptor aircraft, in such a manner that the position of the spots of incidence on the receptacle varies depending on the position of the refuelling boom relative to the receiver aircraft in the approximation operation.

The indication system also comprises at least one monitoring system for monitoring the spots of incidence of the cited light beams and display means for displaying the information from the monitoring system.

The invention, as it will be further described, also relates to a method for the approximation operation of the boom in a tanker aircraft to a receiver aircraft, this method operating such a refueling indication system.

The features, objects and advantages of the invention will become apparent by reading this description in conjunction with the accompanying drawings.

BRIEF DESCRIPTION OF DRAWINGS

FIGS. 4a, 4b and 4c show schematic steps of the location indication using a preferred embodiment of the refuelling indication system according to the present invention.

FIG. 5 shows a 3D schematic view of the complete refuelling indication system according to the present invention.

DETAILED DESCRIPTION OF PREFERRED EMBODIMENTS

Figure 1:
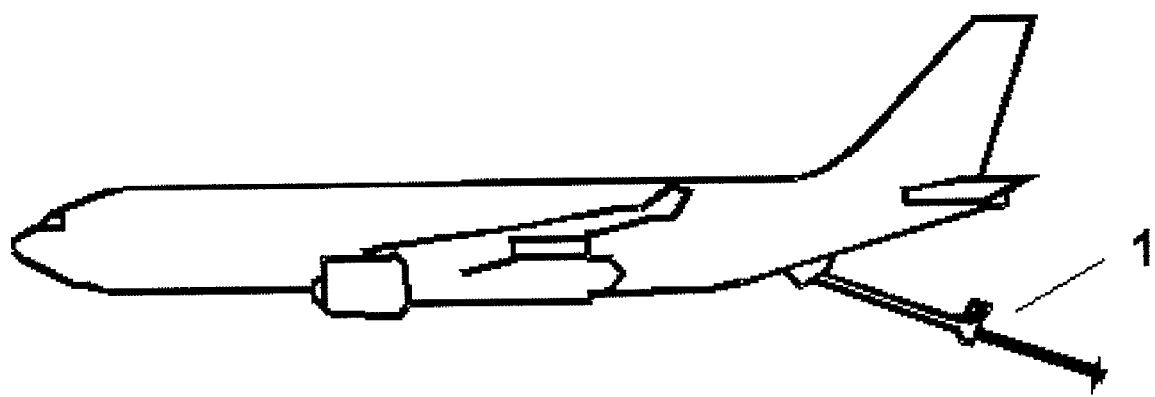
FIG. 1 shows a schematic view of a displayed refuelling boom located at a tanker aircraft.

The present invention provides a system 1 for the indication of the position of a boom 2 at a tanker aircraft in relationship with a receptacle 17 at the receiver aircraft to be refuelled. The system 1 is mountable on the boom 2, and will preferably be located in the extensible part 21 of the refuelling boom 2, said boom 2 also comprising a non-extensible part 22 which is deployably connected to the tanker aircraft. The objective of said system 1 is to provide the boom operator with the relative position between the boom 2 and the receiver aircraft to be refuelled in order to achieve a correct and safe connection between the tanker and the receiver aircraft.

The system 1 comprises several light emitting devices, 23, 24, 25, 26, 27, 28, 29, 30, 31, 32 and 33, each emitting device providing a respective visible light beam, said light beams providing respective spots of incidence 3, 4, 5, 6, 7, 8, 9, 10, 11, 12 and 13, when contacting the receptacle 17 in the receptor aircraft.

The light emitting devices, 23, 24, 25, 26, 27, 28, 29, 30, 31, 32 and 33, will preferably be lasers, although they can also comprise any light emitting device providing light beams with a wavelength such that the lights can be seen during daytime or at night, as for example medium wave infrared emitters.

The system 1 also comprises at least one monitoring system, preferably a camera, and display means.

Figure 2:
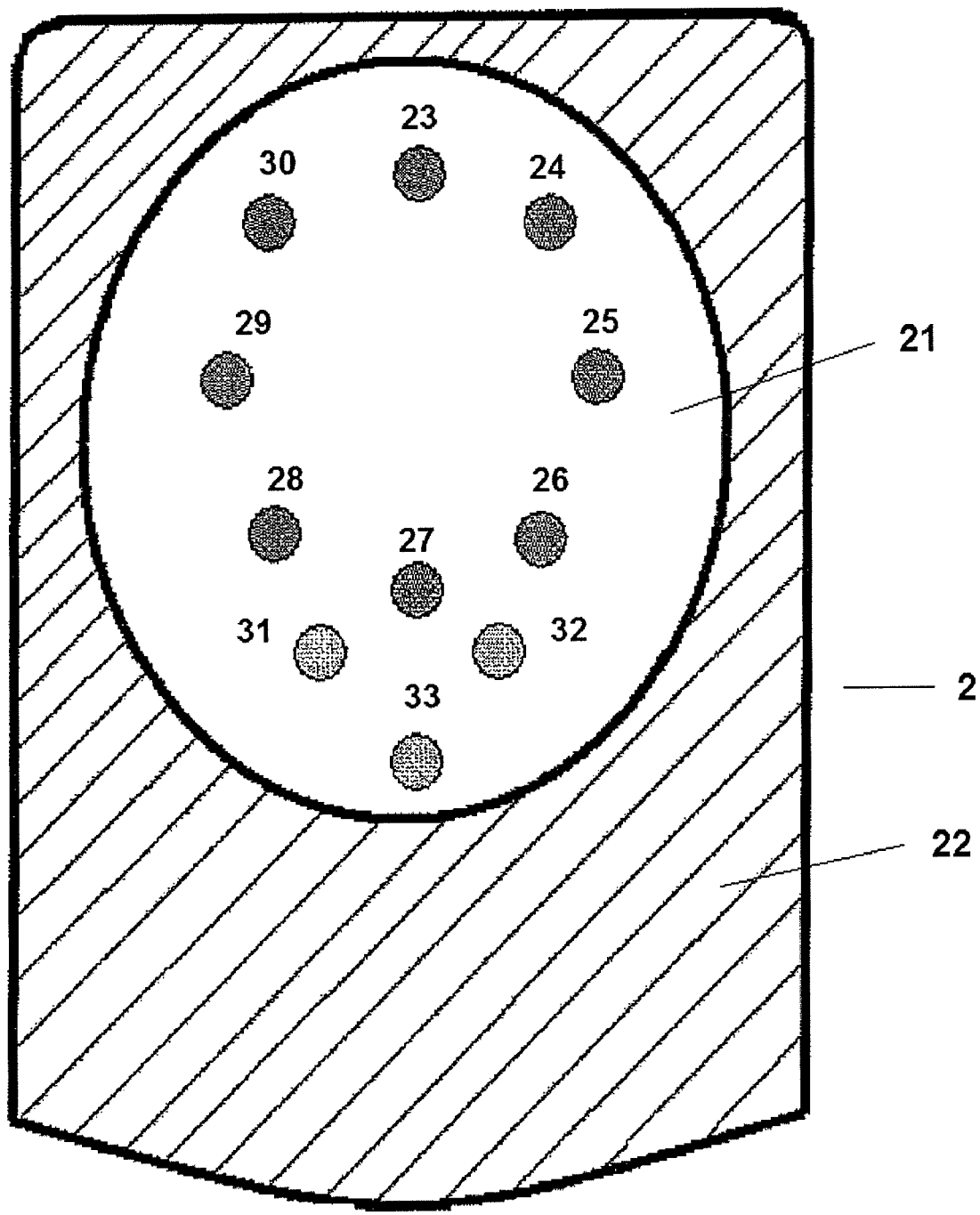
FIG. 2 is a schematic view of a preferred embodiment of the refuelling indication system according to the present invention.

The light emitting devices 23-33 providing visible light beams are located in the extensible part 21 of the boom 2, in a disposition similar to that shown in FIG. 2.

The function of the visible light beams is to show the location of the boom 2 in the tanker aircraft referred to the receptacle 17 in the receiver aircraft to be refuelled.

Figure 3A:
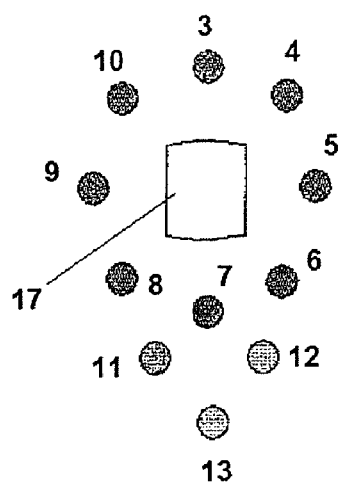
FIGS. 3a, 3b and 3c show schematic steps of the distance indication using a preferred embodiment of the refuelling indication system according to the present invention.
Figure 3B:
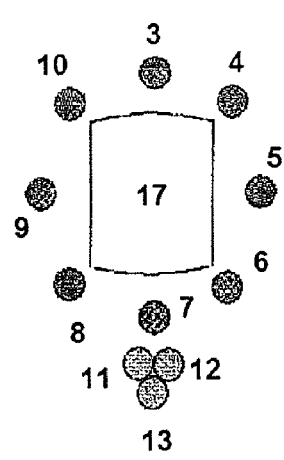
Figure 3C:
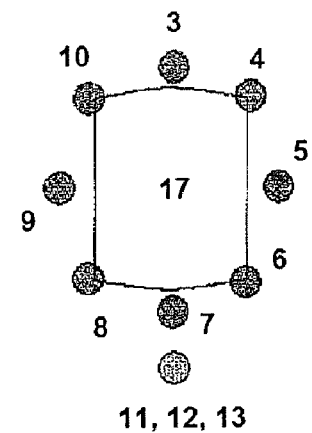

As shown in FIGS. 3a, 3b and 3c, the operator in the tanker aircraft visualizes the spots of incidence 3-13 on the receptacle 17 in the receiver aircraft to be refuelled. Thus, the operator has a reference of what movement should be given to the boom 2 in order to approach the i the receptacle 17.

The light emitting devices 23-33 are oriented in such a manner that the relative position of the spots of incidence 3-13 of the light beams varies depending on the distance of the boom 2 with respect to the receiver aircraft.

The light emitting devices 23-33 are oriented in such a manner that at least two of the light beams providing spots of incidence 3-13 converge at a distance 24 from the boom 2 (see FIG. 5), said distance 24 being selected to provide an indication as to the correct position of the boom 2 with respect to the receiver aircraft. Moreover, the light emitting devices 23-33 are oriented in such a manner that at least two of the light beams providing spots of incidence 3-13 diverge from the boom 2.

FIG. 3a shows a position in which the boom 2 is still far from the receptacle 17. FIG. 3b shows a position in which the boom 2 is near to the receptacle 17. FIG. 3c shows a position in which the boom 2 is at the correct distance 24 from the receptacle 17 at the receiver aircraft to effect refuelling operations.

FIG. 4a shows a position in which the operator of the boom 2 should correct said boom 2 to the left side, towards the receptacle 17. FIG. 4b shows a position in which the operator of the boom 2 should correct said boom 2 to the right side, towards the receptacle 17. FIG. 4c shows a position in which the boom 2 is at the correct location in the receptacle 17 at the receiver aircraft to effect refuelling operations.

Therefore, with the indications obtained by the light beams coming from the emitting devices 23-33, providing spots of incidence 3-13, the operator of the boom 2 has a distance and a location indication between the boom 2 and the receptacle 17 at the receiver aircraft to be refuelled to effect refuelling operations in a proper way.

As schematically represented in FIG. 5, the emitting devices 23-33 project spots of incidence 3-13 on the receptacle 17 in the receiver aircraft to be refuelled, at a distance 24, this being also the distance at which at least two of the spots of incidence 3-13 converge, therefore being shown to the operator a position in which the boom 2 is at the correct location in the receptacle 17 at the receiver aircraft to effect refuelling operations. FIG. 5 also shows the relative distance 25 of the spots of incidence 3-13 to the receptacle 17, when distance 24 has increased over the convergence point of at least two spots of incidence 3-13 at said distance 24.

The invention, as it will be further described, also relates to a method for the approximation operation of the boom 2 in a tanker aircraft to a receptacle 17 in a receiver aircraft operating the system 1, this method comprising the following steps:
a) locating the spots of incidence 3-13 on the receptacle 17 in the receiver aircraft to be refuelled;
b) performing the following steps in any order and in an iterative manner, until the tip of the boom 2 is close enough to the receptacle 17 of the receiver aircraft for a reliable connection:
  i. manoeuvring the boom 2 with respect to the receiver aircraft to make at least two spots of incidence 3-13 converge at a distance 24, this distance 24 being the correct distance for mating the boom 2 into the receptacle 17 of the receiver aircraft;
  ii. manoeuvring the boom 2 with respect to the receiver aircraft to make the spots of incidence 3-13 approximate to the receptacle 17 of the receiver aircraft;
c) manoeuvring the boom 2 with respect to the receiver aircraft to perform the connection between the refuelling boom 2 and the receiver aircraft to effect refuelling operations.

Although the present invention has been fully described in connection with preferred embodiments, it is evident that modifications may be introduced within the scope thereof, not considering this as limited by these embodiments, but by the contents of the following claims.

The invention claimed is:

1. System (1) for providing indication of the position of a refuelling boom (2) in a tanker aircraft relative to a receptacle (17) in a receiver aircraft during refuelling operations, in particular in the approximation operation, characterized in that the system (1) comprises a plurality of light emitting devices (23-33) mountable on the boom (2), each emitting device (23-33) providing a respective visible light beam, said light beams providing spots of incidence (3-13) when contacting the receptacle (17) in the receptor aircraft, in such a manner that the position of the spots of incidence (3-13) on the receptacle (17) varies depending on the position of the refuelling boom (2) relative to the receiver aircraft in the approximation operation.

2. System (1) according to claim 1, characterized in that the light emitting devices (23-33) are oriented in such a manner that the relative position of the spots of incidence (3-13) of the light beams varies depending on the distance of the boom (2) with respect to the receiver aircraft.

3. System (1) according to claim 1, characterized in that the light emitting devices (23-33) are oriented in such a manner that at least two of the light beams providing spots of incidence (3-13) converge at a distance (24) from the boom (2), said distance (24) being selected to provide an indication as to the correct position of the boom (2) with respect to the receiver aircraft.

4. System (1) according to claim 1, characterized in that the light emitting devices (23-33) are oriented in such a manner that at least two of the light beams providing spots of incidence (3-13) diverge from the boom (2).

5. System (1) according to claim 1, characterized in that the emitting devices (23-33) providing visible light beams are lasers.

6. System (1) according to claim 1, characterized in that the system (1) is located in the extensible part (21) of the refuelling boom (2), said boom (2) also comprising a non-extensible part (22) which is deployably connected to the tanker aircraft.

7. System (1) according to claim 1, characterized in that the system (1) also comprises at least one monitoring system for monitoring the sports of incidence (3-13) on the receptacle (17).

8. System (1) according to claim 7, characterized in that the monitoring system comprises at least a camera.

9. System (1) according to claim 7, characterized in that the system (1) also comprises display means for displaying the information from the monitoring system.

10. Method for the approximation operation of a refuelling boom (2) in a tanker aircraft to a receptacle (17) in a receiver aircraft operating the system (1) of claim 1, this method comprising the following steps:
a) locating the spots of incidence (3-13) on the receptacle (17) in the receiver aircraft to be refuelled;

b) performing the following steps in any order and in an iterative manner, until the tip of the boom (2) is close enough to the receptacle (17) of the receiver aircraft for a reliable connection:
  i. manoeuvring the boom (2) with respect to the receiver aircraft to make at least two spots of incidence (3-13) converge at a distance (24) from the boom (2), this distance (24) being the correct distance for mating the boom (2) into the receptacle (17) of the receiver aircraft;
  ii. manoeuvring the boom (2) with respect to the receiver aircraft to make the spots of incidence (3-13) approximate to the receptacle (17) of the receiver aircraft;
c) manoeuvring the boom (2) with respect to the receiver aircraft to perform the connection between the refuelling boom (2) and the receiver aircraft to effect refuelling operations.

* * * * *